US012797807B2

(12) United States Patent
Zhao et al.

(10) Patent No.: US 12,797,807 B2
(45) Date of Patent: Nov. 17, 2026

(54) NANOFIBER BASED OIL-WATER SEPARATION AND PURIFICATION MATERIAL HAVING A SHIFTED INCLINED-HOLE STRUCTURE AND PREPARATION METHOD THEREOF

(71) Applicant: JIAXING FREBANG NEW MATERIAL TECHNOLOGY CO., LTD, Jiaxing (CN)

(72) Inventors: Xinglei Zhao, Jiaxing (CN); Pan Jiang, Jiaxing (CN); Ting Hua, Jiaxing (CN); Peng Wang, Jiaxing (CN)

(73) Assignee: JIAXING FREBANG NEW MATERIAL TECHNOLOGY CO., LTD, Jiaxing (CN)

( * ) Notice: Subject to any disclaimer, the term of this patent is extended or adjusted under 35 U.S.C. 154(b) by 307 days.

(21) Appl. No.: 18/827,008

(22) Filed: Sep. 6, 2024

(65) Prior Publication Data

US 2024/0424449 A1 Dec. 26, 2024

Related U.S. Application Data

(63) Continuation of application No. PCT/CN2023/078033, filed on Feb. 24, 2023.

(51) Int. Cl.
*B01D 69/12* (2006.01)
*B01D 71/06* (2006.01)

(52) U.S. Cl.
CPC ......... *B01D 69/1216* (2022.08); *B01D 71/06* (2013.01); *B01D 2323/081* (2022.08); (Continued)

(58) Field of Classification Search
CPC ................ B01D 69/1216; B01D 71/06; B01D 2323/081; B01D 2323/62; (Continued)

(56) References Cited

U.S. PATENT DOCUMENTS 4,280,909 A * 7/1981 Deutsch ................. B01D 53/22 210/500.21
4,376,046 A * 3/1983 Deutsch ............... B01D 61/147 417/572

(Continued)

FOREIGN PATENT DOCUMENTS

CN 103866492 A 6/2014
CN 104436760 A 3/2015

(Continued)

OTHER PUBLICATIONS

Internation Search Report of PCT/CN2023/078033, Mailed Jun. 7, 2023.

*Primary Examiner* — Madeline Gonzalez

(57) ABSTRACT

In a method for preparing a nanofiber based oil-water separation and purification material having a shifted inclined-hole structure, firstly, a melt-spinning method is used for preparing a multi-layer fiber membrane, and then according to the requirements of the size, number and arrangement of holes on each layer of fiber membrane, a puncher is used for punching inclined frustum cone-shaped through holes on the fiber membrane. Finally, according to the requirements of relative positions of the inclined frustum cone-shaped through holes on fiber membranes in different layers, multiple layers of fiber membranes are composited to prepare a nanofiber based oil-water separation and purification material having a shifted inclined-hole structure. The oil-water separation and purification material is a multi-layer composite fiber membrane. Each layer of fiber membrane has a plurality of uniformly distributed inclined frustum cone-shaped through holes.

9 Claims, 3 Drawing Sheets

(52) U.S. Cl.
CPC .. *B01D 2323/62* (2022.08); *B01D 2325/0214* (2022.08); *B01D 2325/02834* (2022.08)

(58) Field of Classification Search
CPC .. B01D 2325/0214; B01D 2325/02834; B01D 67/00042; B01D 67/0025; B01D 69/1213; B01D 69/02; B01D 2323/39; B01D 2325/02; B01D 2325/0283; B01D 2325/38; B01D 69/12; B01D 67/0002; B01D 71/26; B01D 71/34; B01D 71/38; B01D 71/48; B01D 71/68; C02F 1/40; C02F 2101/32
USPC ........ 210/497.3, 490, 500.1, 500.21, 500.22, 210/500.23, 505, 508, 491, 321.6
See application file for complete search history.

(56) References Cited

U.S. PATENT DOCUMENTS

| | | | |
|---|---|---|---|
| 2012/0244314 | A1 | 9/2012 | Scheibner et al. |
| 2013/0334129 | A1 | 12/2013 | Vasilyeva et al. |
| 2020/0197878 | A1 | 6/2020 | Laoui et al. |

FOREIGN PATENT DOCUMENTS

| | | | |
|---|---|---|---|
| CN | 105603637 | A | 5/2016 |
| CN | 106012291 | A | 10/2016 |
| CN | 114984764 | A | 9/2022 |

* cited by examiner

NANOFIBER BASED OIL-WATER SEPARATION AND PURIFICATION MATERIAL HAVING A SHIFTED INCLINED-HOLE STRUCTURE AND PREPARATION METHOD THEREOF

CROSS-REFERENCE TO RELATED APPLICATIONS

This application is a continuation of International Patent Application No. PCT/CN2023/078033 with a filing date of Feb. 24, 2023, designating the United States, and further claims priority to Chinese Patent Application No. 202210230778.6 with a filing date of Mar. 9, 2022. The content of the aforementioned applications, including any intervening amendments thereto, is incorporated herein by reference.

TECHNICAL FIELD

The present disclosure belongs to the technical field of oil-water separation and purification materials, and relates to a nanofiber based oil-water separation and purification material having a shifted inclined-hole structure and a preparation method thereof.

BACKGROUND

Effective separation of two-phase incompatible systems is widely applied in many fields. Excellent oil-water separation and purification materials are characterized by high separation efficiency, high flux, and high contaminant capacity. However, existing filter materials usually have a low flux, mainly because the existing filter materials are mostly melt-blown filter materials or nanofiber filter materials with planar structures. The randomly stacked planar micronfiber or nanofiber structures collide with water/oil molecules when encountering water/oil molecules, which hinders passage of liquid molecules, thereby forming a large resistance to the passage of the liquid molecules, resulting in high resistance of the overall filter material. The planar structure of the existing filter material makes the contaminant capacity insufficient. Existing public patents "An efficient oil-water separation composite fiber membrane and a preparation method thereof" (Chinese Patent Application No. CN201410125768.1), "A magnetic response efficient oil-water separation fiber membrane and a preparation method thereof" (Chinese Patent Application No. CN201410584912.8), "High-efficiency electrospinning oil-water separation fiber membrane" (Chinese Patent Application No. CN201610040433.9), "An oil-water separation fiber membrane having excellent anti-fouling ability and a preparation method thereof" (Chinese Patent Application No. CN201610580631.4) report methods for preparing oil-water separation materials by electrospinning, but the materials prepared in the above method still have a planar structure, resulting in a low flux of the fiber membrane. Therefore, there is an urgent need for an efficient oil-water separation material having a small diameter, small pore size and a high flux.

SUMMARY

The objects of the present disclosure are to solve the above problems in the existing art, and to provide a nanofiber based oil-water separation and purification material having a shifted inclined-hole structure and a preparation method thereof.

To achieve the above objects, the technical solution adopted by the present disclosure is as follows.

A nanofiber based oil-water separation and purification material having a shifted inclined-hole structure is a multi-layer composite fiber membrane. Each layer of fiber membrane has a plurality of uniformly distributed inclined frustum cone-shaped through holes. The large end of a frustum cone-shaped through hole is upward. The small end of the frustum cone-shaped through hole is downward. Large ends of any two adjacent inclined frustum cone-shaped through holes in each layer of fiber membrane are tangent to each other. Except the bottom layer, each frustum cone-shaped through hole in each layer of fiber membrane has one corresponding frustum cone-shaped through hole in an under layer of the fiber membrane communicating with the each frustum cone-shaped through hole. The small end of the each frustum cone-shaped through hole in each layer of fiber membrane communicates with the large end of the one corresponding inclined frustum cone-shaped through hole in the under layer of the fiber membrane.

All inclined frustum cone-shaped through holes have the same size, inclination direction and inclination angle.

A percentage of a sum of areas of large ends of all inclined frustum cone-shaped through holes in each layer of fiber membrane to a unilateral surface area of the each layer of fiber membrane is 80 to 90%. Similar to the concept of porosity, the higher the percentage is, the higher the percentage of holes is, and the higher the flux is.

Fibers making up each layer of fiber membrane are oleophylic hydrophobic nanofibers.

In some embodiments, the oleophylic hydrophobic nanofibers are made of oleophylic polyvinylidene fluoride, polyethersulfone, polysulfone, polypropylene, polyethylene, polyester or polyvinyl butyral.

In some embodiments, an average diameter of the oleophylic hydrophobic nanofibers is 50 to 800 nm.

In some embodiments, a number of the fiber membranes is 3-5.

In some embodiments, a diameter of the large end of the inclined frustum-shaped through hole is 80-200 μm, a diameter of the small end is 20-60 μm, the height is 2-40 μm, and the inclination angle is 20-70°. If the size of the inclined frustum-shaped through hole is too small, the size cannot be achieved by the existing technology. If the size is too large, the flux and separation efficiency of the oil-water separation and purification material are reduced.

In some embodiments, a number of one of rows or columns of inclined frustum-shaped through holes per square meter on the surface of one side of the fiber membrane is 5,000 to 12,000. Too small amount of the through holes may result in low flux of the oil-water separation and purification material.

In some embodiments, the flux of the oil-water separation and purification material is greater than 2500 $L/m^2$ h, and the separation efficiency of the oil-water separation and purification material is greater than 99.99%. It can be widely used in oil-water separation, hydrogen peroxide purification and other fields. The flux and separation efficiency are measured using the SAEJ1488 standards, and the highest levels of flux and separation efficiency of the oil-water separation and purification materials in the existing art are 1600 $L/m^2$ h and 99%, respectively.

The present disclosure also provides a preparation method of the oil-water separation and purification material described above. First, a multi-layer fiber membrane is prepared by using a melt-spinning method, and then according to size, number and arrangement requirements of holes on each layer of fiber membrane, inclined frustum-shaped through holes are punched on the each layer of fiber membrane by using a puncher, and according to relative position requirements on the inclined frustum-shaped through holes on different layers of fiber membranes, a plurality of layers of fiber membranes are compounded to prepare the oil-water separation and purification material. A compounding device is used. The compounding device has a laser locator to ensure that the holes in each layer are arranged as designed.

In some embodiments, process parameters of the melt-spinning are: a melting temperature of 200 to 320° C., a wind temperature of 200 to 320° C., a die head temperature of 180 to 320° C., and a fan frequency of 50 Hz.

The principles of the present disclosure are as follows.

The present disclosure designs and develops an oil-water separation and purification material having a shift inclined hole structure (a multi-layer inclined frustum cone-shaped through hole structure). The material utilizes the pressure difference formed by the liquid flowing on the inclined surface, together with the oleophilic and hydrophobic properties of the fibers constituting the oil-water separation and purification materials, making the oil pass through the inclined surface of the inclined frustum cone-shaped through hole and the water intercepted by the agglomerations (high efficiency of separation), and later the liquid that has not passed through the inclined surface flows out of the small end of the inclined frustum cone-shaped through hole (which has a high flux compared to the planar structure) and enters into the next layer and repeats the process of oil-water separation.

Compared with the planar structure of the filter material, the filter material having shift inclined holes has lower resistance to liquid under the condition of equal filtration efficiency. The main reason is that when the filter material in the planar structure encounters a vertical liquid flow, liquid molecules will directly hit the fiber surface so that the case where the flow direction changes to avoid the fiber will not happen.

While the liquid molecules vertically flowing encounters the filter material having the inclined frustum cone-shaped through hole, a portion of the molecules will impact the fiber surface to form a liquid pressure, thus forcing the subsequent liquid molecules to change the flow direction to the next layer of the inclined frustum cone-shaped through holes. This part of molecules are completely free of impact and have minimal resistance (the lower the resistance, the greater the flux).

Beneficial Effects (1) The nanofiber based oil-water separation and purification material having the shifted inclined-hole structure of the present disclosure can obtain a filter material in a hierarchical pore structure, and the stacking structure of the filter material can be controlled and adjusted.

(2) The nanofiber based oil-water separation and purification material having the shifted inclined-hole structure of the present disclosure has an inclined slope structure and a large-and-small hole high-throughput channel, and has the characteristics of high oil-water separation efficiency and high throughput.

(3) Compared with the filter material in a planar structure, the nanofiber based oil-water separation and purification material having the shifted inclined-hole structure of the present disclosure has a larger total area and thus a higher contaminant capacity.

DETAILED DESCRIPTION OF PREFERRED EMBODIMENTS

Figure 1:
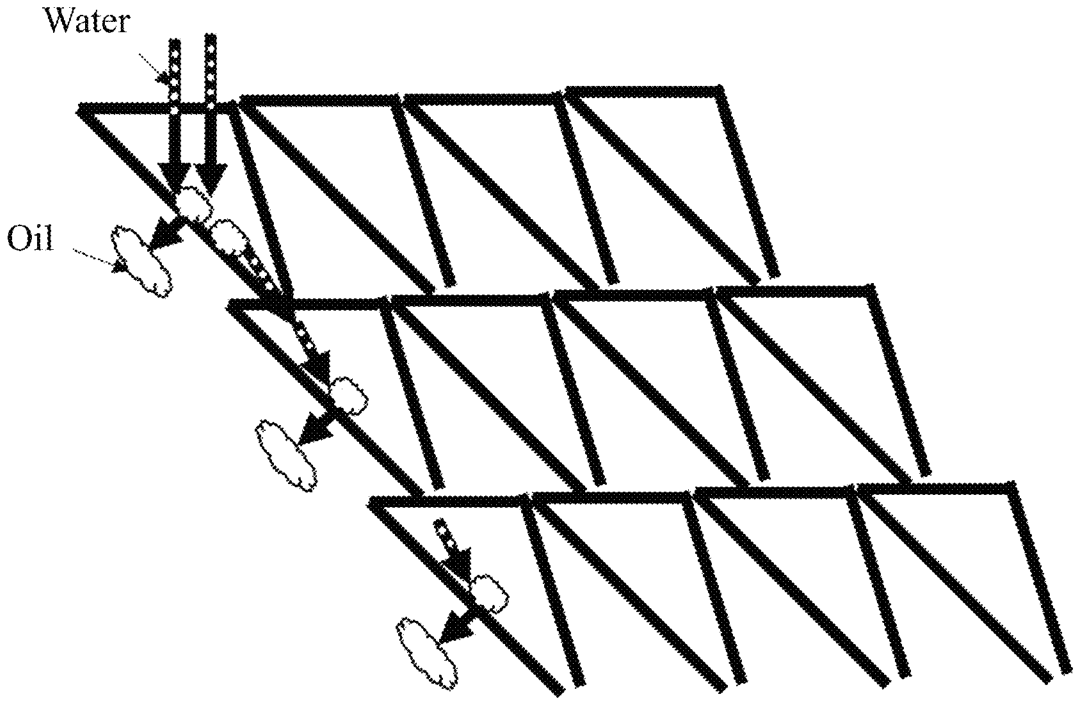
FIGS. 1 to 3 are schematic diagrams showing the positional relationship of the inclined frustum cone-shaped through holes on each layer of fiber membrane in the nanofiber based oil-water separation and purification material having the shifted inclined-hole structure and the oil-water separation effect in embodiments 1, 5, and 6, respectively.

The present disclosure will be further described below in conjunction with specific embodiments. It should be understood that these embodiments are only used to illustrate the present disclosure and are not intended to limit the scope of the present disclosure. In addition, it should be understood that after reading the content taught by the present disclosure, those skilled in the art can make various changes or modifications to the present disclosure, and these equivalent forms also fall within the scope limited by the appended claims of the present application.

Embodiment One

A nanofiber based oil-water separation and purification material having a shifted inclined-hole structure, the specific steps are as follows.

(1) Three polyvinylidene fluoride fiber membranes are prepared by meltspinning. The average diameter of the fibers in the fiber membranes is 300 nm, in and the process parameters of the meltspinning are a melting temperature of 225° C., a wind temperature of 230° C., a die head temperature of 220° C., and a fan frequency of 50 Hz.

(2) A puncher is used for punching inclined frustum cone-shaped through holes on each fiber membrane so that each fiber membrane is evenly distributed with multiple inclined frustum cone-shaped through holes, and the large end of the inclined frustum cone-shaped through hole face is upward and the small end of the inclined frustum cone-shaped through hole face is downward. Seeing from the surface of each fiber membrane where the large end of the inclined frustum cone-shaped through hole is located, on average, within one square meter, each row has 8900 inclined frustum cone-shaped through holes. Large ends of any two adjacent inclined frustum cone-shaped through holes in each layer of fiber membrane are tangent to each other. All inclined frustum cone-shaped through holes have the same size, inclination direction and inclination angle. The average diameter of the large end of each inclined frustum cone-shaped through hole is 120 μm, the diameter of the small end is 45 μm, the height is 26 μm, and the slope of the inclined cone is 46°. The percentage of the sum of areas of large ends of all inclined frustum cone-shaped through holes in each layer of fiber membrane to a unilateral surface area of the each layer of fiber membrane is 82%.

(3) According to the relative position requirements of "each frustum cone-shaped through hole in each layer of fiber membrane has one corresponding frustum cone-shaped through hole in an under layer of the fiber membrane communicating with the each frustum cone-shaped through hole; and the small end of the each frustum cone-shaped through hole in each layer of fiber membrane communicates with the large end of the one corresponding inclined frustum cone-shaped through hole in the under layer of the fiber membrane", three fiber membranes having inclined frustum cone-shaped through holes are composited by using a compounding apparatus having a laser locator to obtain the nanofiber based oil-water separation and purification material having the shifted inclined-hole structure.

The final prepared nanofiber based oil-water separation and purification material having the shifted inclined-hole structure is a three-layer composite fiber membrane as shown in FIG. 1. The flux of the nanofiber based oil-water separation and purification material having the shifted inclined-hole structure is 3476 L/$m^2$ h, and the separation efficiency is 99.995%.

Embodiment Two

A preparation method of the nanofiber based oil-water separation and purification material having a shifted inclined-hole structure is basically the same as Embodiment one. The difference lies in that the material of the fiber membrane in step (1) is polypropylene fiber. The process parameters of meltspinning are: a melting temperature of 250° C., a wind temperature of 220° C., a die head temperature of 235° C., and a fan frequency of 50 Hz.

The flux of the nanofiber based oil-water separation and purification material having the shifted inclined-hole structure finally obtained is 3359 L/$m^2$ h, and the separation efficiency is 99.997%.

Embodiment Three

A preparation method of the nanofiber based oil-water separation and purification material having the shifted inclined-hole structure is basically the same as Embodiment one. The difference lies in that the material of the fiber membrane in step (1) is polyethylene fiber. The process parameters of meltspinning are: a melting temperature of 235° C., a wind temperature of 225° C., a die head temperature of 235° C., and a fan frequency of 50 Hz. The flux of the nanofiber based oil-water separation and purification material having the shifted inclined-hole structure finally obtained is 3841 L/$m^2$ h, and the separation efficiency is 99.992%.

Embodiment Four

A preparation method of the nanofiber based oil-water separation and purification material having a shifted inclined-hole structure is basically the same as Embodiment one. The difference lies in that the material of the fiber membrane in step (1) is polyvinyl butyral fiber. The process parameters of meltspinning are: a melting temperature of 205° C., a wind temperature of 200° C., a die head temperature of 210° C., and a fan frequency of 50 Hz. The flux of the nanofiber based oil-water separation and purification material having the shifted inclined-hole structure finally obtained is 4019 L/$m^2$ h, and the separation efficiency is 99.993%.

Embodiment Five

A preparation method of the nanofiber based oil-water separation and purification material having the shifted inclined-hole structure, the specific steps are as follows.

(1) Four polyethersulfone fiber membranes are prepared by meltspinning. The average diameter of the fibers in the fiber membranes is 800 nm, and the process parameters of the meltspinning are a melting temperature of 305° C., a wind temperature of 300° C., a die head temperature of 305° C., and a fan frequency of 50 Hz.

(2) A puncher is used for punching inclined frustum cone-shaped through holes on each fiber membrane so that each fiber membrane is evenly distributed with multiple inclined frustum cone-shaped through holes, and the large end of the inclined frustum cone-shaped through hole face is upward and the small end of the inclined frustum cone-shaped through hole face is downward. Seeing from the surface of each fiber membrane where the large end of the inclined frustum cone-shaped through hole is located, on average, within one square meter, each column has 11080 inclined frustum cone-shaped through holes. Large ends of any two adjacent inclined frustum cone-shaped through holes in each layer of fiber membrane are tangent to each other. All inclined frustum cone-shaped through holes have the same size, inclination direction and inclination angle. The average diameter of the large end of each inclined frustum cone-shaped through hole is 180 μm, the diameter of the small end is 55 μm, the height is 35 μm, and the slope of the inclined cone is 38°. The percentage of the sum of areas of large ends of all inclined frustum cone-shaped through holes in each layer of fiber membrane to a unilateral surface area of the each layer of fiber membrane is 86%.

(3) According to the relative position requirements of "each frustum cone-shaped through hole in each layer of fiber membrane has one corresponding frustum cone-shaped through hole in an under layer of the fiber membrane communicating with the each frustum cone-shaped through hole; and the small end of the each frustum cone-shaped through hole in each layer of fiber membrane communicates with the large end of the one corresponding inclined frustum cone-shaped through hole in the under layer of the fiber membrane", four fiber membranes having inclined frustum cone-shaped through holes are composited by using a compounding apparatus having a laser locator to obtain the nanofiber based oil-water separation and purification material having the shifted inclined-hole structure.

Figure 2:
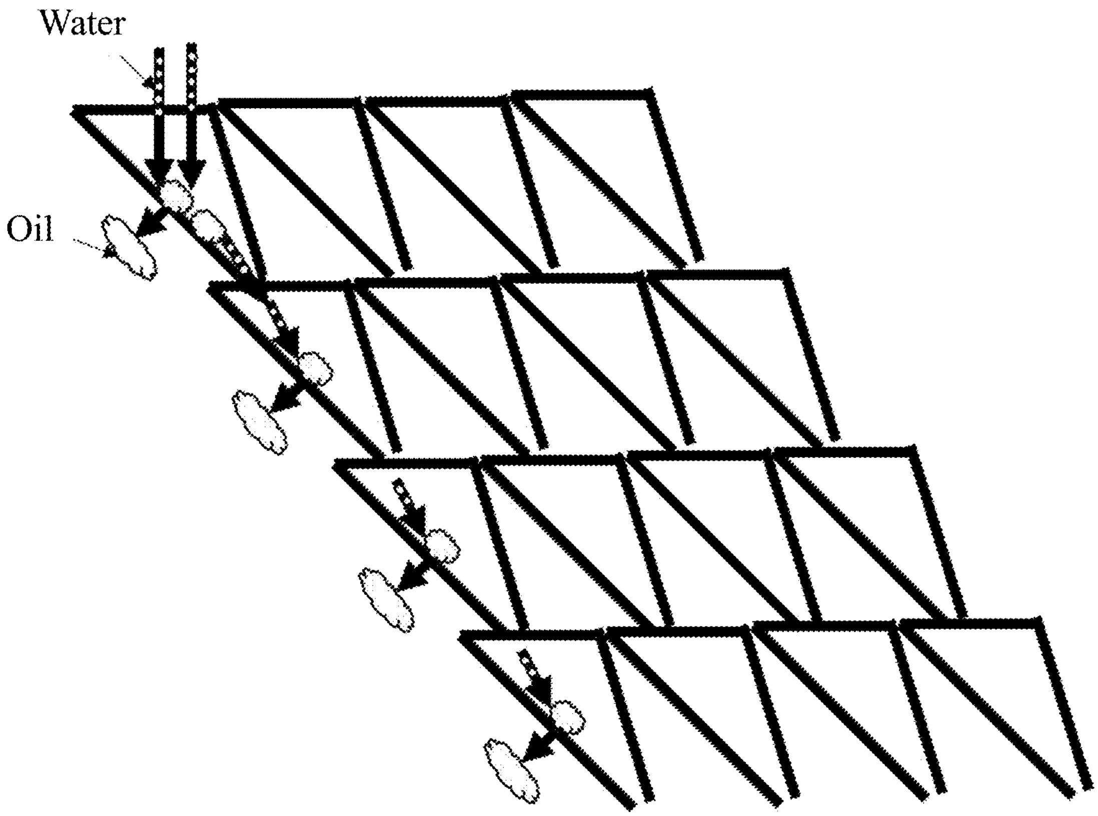

The final prepared nanofiber based oil-water separation and purification material having a shifted inclined-hole structure is a four-layer composite fiber membrane as shown in FIG. 2. The flux of the nanofiber based oil-water separation and purification material having the shifted inclined-hole structure is 4430 L/$m^2$ h, and the separation efficiency is 99.999%.

Embodiment Six

A preparation method of the nanofiber based oil-water separation and purification material having a shifted inclined-hole structure, the specific steps are as follows.

Five polysulfone fiber membranes are prepared by meltspinning. The average diameter of the fibers in the fiber membranes is 550 nm, and the process parameters of the meltspinning are a melting temperature of 285° C., a wind temperature of 290° C., a die head temperature of 290° C., and a fan frequency of 50 Hz.

A puncher is used for punching inclined frustum cone-shaped through holes on each fiber membrane so that each fiber membrane is evenly distributed with multiple inclined frustum cone-shaped through holes, and the large end of the inclined frustum cone-shaped through hole face is upward and the small end of the inclined frustum cone-shaped through hole face is downward. Seeing from the surface of each fiber membrane where the large end of the inclined frustum cone-shaped through hole is located, on average, within one square meter, each row has 9089 inclined frustum cone-shaped through holes. Large ends of any two adjacent inclined frustum cone-shaped through holes in each layer of fiber membrane are tangent to each other. All inclined frustum cone-shaped through holes have the same size, inclination direction and inclination angle. The average diameter of the large end of each inclined frustum cone-shaped through hole is 168 μm, the diameter of the small end is 28 μm, the height is 22 μm, and the slope of the inclined cone is 58°. The percentage of the sum of areas of large ends of all inclined frustum cone-shaped through holes in each layer of fiber membrane to a unilateral surface area of the each layer of fiber membrane is 88%.

According to the relative position requirements of "each frustum cone-shaped through hole in each layer of fiber membrane has one corresponding frustum cone-shaped through hole in an under layer of the fiber membrane communicating with the each frustum cone-shaped through hole; and the small end of the each frustum cone-shaped through hole in each layer of fiber membrane communicates with the large end of the one corresponding inclined frustum cone-shaped through hole in the under layer of the fiber membrane", five fiber membranes having inclined frustum cone-shaped through holes are composited by using a compounding apparatus having a laser locator to obtain the nanofiber based oil-water separation and purification material having the shifted inclined-hole structure.

Figure 3:
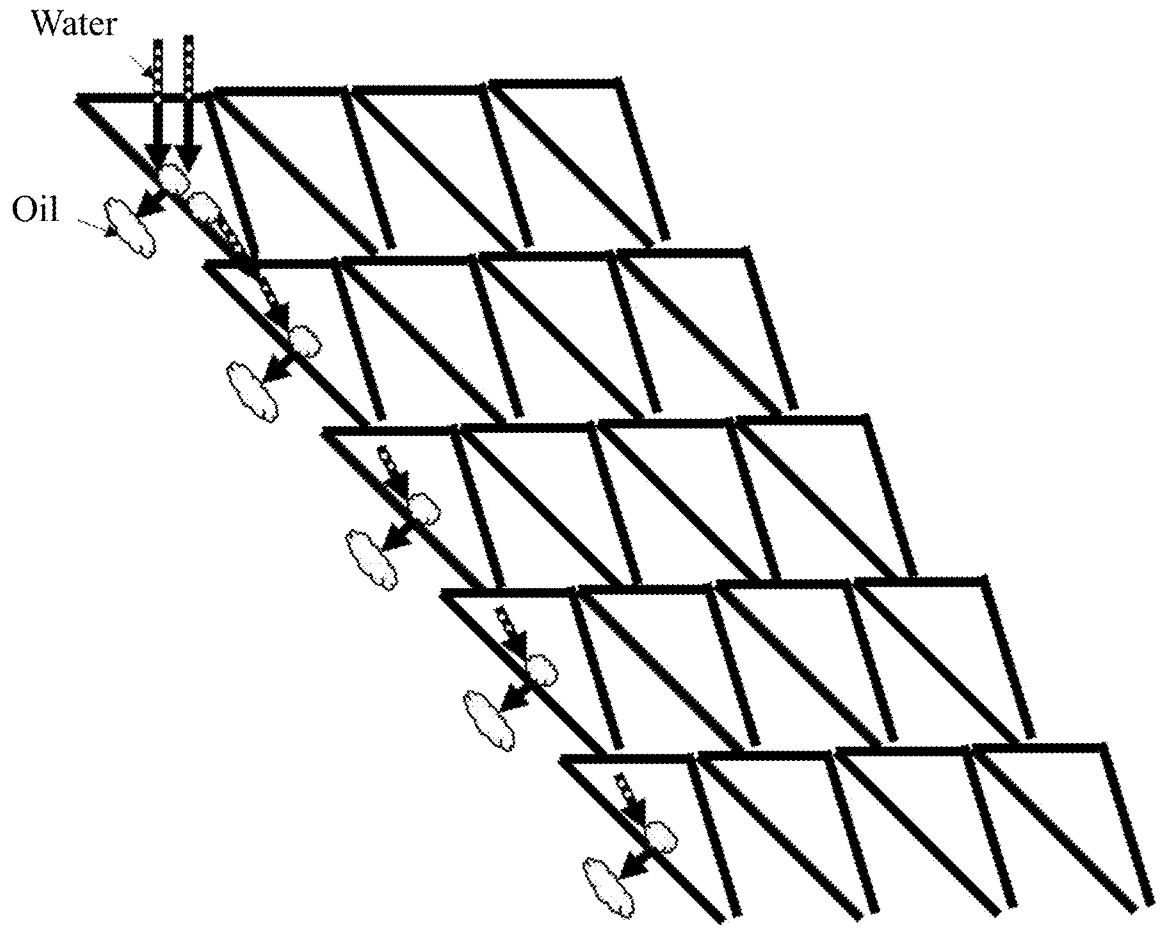

The final prepared nanofiber based oil-water separation and purification material having the shifted inclined-hole structure is a five-layer composite fiber membrane as shown in FIG. 3. The flux of the nanofiber based oil-water separation and purification material having a shifted inclined-hole structure is 4509 L/$m^2$ h, and the separation efficiency is 99.999%.

What is claimed is:

1. A nanofiber based oil-water separation and purification material having a shifted inclined-hole structure, wherein the material is a multi-layer composite fiber membrane, each layer of the fiber membrane has a plurality of uniformly distributed inclined frustum cone-shaped through holes, and a large end of each of the frustum cone-shaped through holes is upward, and a small end of each of the frustum cone-shaped through holes is downward; large ends of any two adjacent inclined frustum cone-shaped through holes in each layer of the fiber membrane are tangent to each other; each frustum cone-shaped through hole in each layer of the fiber membrane has one corresponding frustum cone-shaped through hole in an under layer of the fiber membrane; and the small end of the each frustum cone-shaped through hole in each layer of fiber membrane communicates with the large end of the one corresponding inclined frustum cone-shaped through hole in the under layer of the fiber membrane;

all of the inclined frustum cone-shaped through holes have an identical size, an identical inclination direction and an identical inclination angle;

a percentage of a sum of areas of large ends of all of the inclined frustum cone-shaped through holes in each layer of the fiber membrane to a unilateral surface area of the each layer of the fiber membrane is 80 to 90%; and each layer of the fiber membrane is made of oleophylic hydrophobic nanofibers.

2. The nanofiber based oil-water separation and purification material according to claim 1, wherein the oleophylic hydrophobic nanofibers are made of polyvinylidene fluoride, polyethersulfone, polysulfone, polypropylene, polyethylene, polyester or polyvinyl butyral.

3. The nanofiber based oil-water separation and purification material according to claim 2, wherein the oleophylic hydrophobic nanofibers have an average diameter of 50 to 800 nm.

4. The nanofiber based oil-water separation and purification material according to claim 1, wherein the fiber membrane has 3 to 5 layers.

5. The nanofiber based oil-water separation and purification material according to claim 1, wherein each of the inclined frustum cone-shaped through holes has a diameter of 80 to 200 μm at the large end, a diameter of 20 to 60 μm at the small end, a height of 2 to 40 μm, and an inclination angle of 20 to 70°.

6. The nanofiber based oil-water separation and purification material according to claim 1, wherein a number of one of rows or columns of the inclined frustum cone-shaped through holes per square meter on a unilateral surface of the fiber membrane is 5,000 to 12,000.

7. The nanofiber based oil-water separation and purification material according to claim 1, wherein a flux of the nanofiber based oil-water separation and purification material is greater than 2500 L/$m^2$h, and a separation efficiency of the nanofiber based oil-water separation and purification material is greater than 99.99%.

8. A preparation method of the nanofiber based oil-water separation and purification material according to claim 1, comprising:

firstly, preparing a plurality of fiber membranes by using a melt-spinning method, then according to requirements on the size, number and arrangement of the through holes on each of the plurality of fiber membranes, punching the inclined frustum cone-shaped through holes on the plurality of fiber membranes by using a puncher, and finally, according to requirements on relative positions of the inclined frustum cone-shaped through holes on each layer of the composite fiber membrane, compounding the plurality of fiber membranes to obtain the nanofiber based oil-water separation and purification material having the shifted inclined-hole structure;

wherein a compounding apparatus having a laser positioner is used for compounding.

9. The preparation method according to claim 8, wherein process parameters of the melt-spinning method are: a melting temperature of 200 to 320° C., a wind temperature of 200 to 320° C., a die head temperature of 180 to 320° C., and a fan frequency of 50 Hz.

* * * * *